United States Patent [19]

DeLapp

[11] 3,716,489
[45] Feb. 13, 1973

[54] SUPERSATURATED SOLID SOLUTIONS OF PHOTOCHROMIC MATERIALS IN EPOXIES

[75] Inventor: Darwin Fiske DeLapp, New Canaan, Conn.

[73] Assignee: American Cyanamid Company, Stamford, Conn.

[22] Filed: Oct. 2, 1970

[21] Appl. No.: 77,731

[52] U.S. Cl. ............... 252/300, 156/99, 156/100, 161/1, 192, 410; 350/160 P; 264/1
[51] Int. Cl. .......... G02c 7/10, G02b 5/28, F21v 9/00
[58] Field of Search ............... 252/300; 260/33.6 EP; 350/160 P; 96/30 PC

[56] References Cited

UNITED STATES PATENTS

| 3,635,544 | 1/1972 | Stamm et al. | 161/192 X |
| 2,976,259 | 3/1961 | Hardy | 252/300 |
| 3,095,422 | 6/1963 | Duennenberger et al. | 252/300 |
| 3,214,333 | 10/1965 | Moore et al. | 252/300 |
| 3,270,639 | 9/1966 | Windsor | 252/300 |
| 3,461,287 | 8/1969 | Rai | 252/300 |
| 3,413,268 | 11/1968 | Feichtinger et al. | 260/33.6 EP |
| 3,432,574 | 3/1969 | Kamal | 260/33.6 EP |
| 3,471,290 | 10/1969 | Amidon et al. | 96/90 PC |
| 3,519,602 | 7/1970 | Castro et al. | 260/33.6 EP |
| 3,538,185 | 1/1970 | Davis | 260/33.6 EP |
| 3,560,589 | 2/1971 | Sato et al. | 260/33.6 EP |

OTHER PUBLICATIONS

Srenka et al., Chemistry, (1961) pp. 164.

*Primary Examiner*—George F. Lesmes
*Assistant Examiner*—J. P. Banner
*Attorney*—Samuel Branch Walker

[57] ABSTRACT

A fast-acting photochromic filter consists of (1) a solid optically transparent epoxy matrix of (2) essentially free from non-combined, that is molecular oxygen, and for storage stability protected from diffusion of atmospheric oxygen, in which is (3) dispersed, in solid solution, at least one light absorbing compound having a polynuclear conjugated aromatic ring structure.

As many photochromic materials have low solubility in a matrix, and a solid solution is desired, both the epoxide component of the epoxy resin and the photochromic material are dissolved in a volatile solvent such as benzene, or a halogenated or alkylated benzene, and the solvent evaporated, to form a supersaturated solution, to which hardener is added before crystallization occurs.

Edge sealing of the glass by a polyvinyl alcohol, layer or a metal seal, or hermetic glass seal maintains oxygen exclusion.

9 Claims, No Drawings

SUPERSATURATED SOLID SOLUTIONS OF PHOTOCHROMIC MATERIALS IN EPOXIES

CROSS REFERENCES

Photochromic matrices are disclosed in Ser. No. 769,028, Oct. 21, 1968, Stamm, Brinen, Tennant (nee Hosterman) and Halverson, PHOTOCHROMIC POLYMER MATRIX, now U. S. Pat. No. 3,635,544 dated Jan. 18, 1972 which in turn is a continuation-in-part of Ser. No. 332,752, Dec. 23, 1963, Stamm, Brinen, Hosterman and Halverson, METASTABLE ELECTRONIC STATES, now abandoned; said Ser. No. 332,752 has common subject matter also disclosed in Ser. No. 332,921, Dec. 23, 1963, Stamm, Brinen, Hosterman and Halverson, POLYMER MATRIX FOR ABSORPTION, now abandoned, and in Ser. No. 807,920, Mar. 17, 1969, Stamm, DEUTERATED POLYCYCLIC AROMATIC COMPOUNDS IN PHOTOCHROMIC FILTERS now abandoned which in turn is a Continuation-in-Part of Ser. No. 408,718, Oct. 30, 1964, now abandoned.

SUMMARY OF THE INVENTION

This invention relates to dissolving both a photochromic material and at least part of the epoxide component of an epoxy resin in a common solvent, preferably benzene or a halogenated and/or alkylated benzene, and after complete solution, evaporating the solvent on a shell evaporator as a thin film, which avoids bubble formation or boiling, which can induce crystallization, using vacuum and heat, with the terminal heat and vacuum such that all solvent is removed, thereby forming a super-saturated solution of the photochromic material in the epoxide. Before crystallization occurs, additional epoxy resin components, such as an anhydride or amine hardener, and catalyst are added, and hardening induced to solidify the epoxy resin with the photochromic material in solid solution therein. Usually a hardener-catalyst combination are used such that heating is required to cure the epoxy resin in a reasonable length of time.

Triplet-triplet photochromic filters are described in Pat. No. 3,635,544, Stamm et al., supra, also Canadian Pat. No. 746,257 of Nov. 15, 1966. The increase in life time of the triplet state resulting from deuteration of the conjugated aromatic ring systems is disclosed in Ser. No. 807,920, supra. The disclosures from U.S. Pat. No. 3,635,544 and No. 807,920 are hereby herein incorporated by reference.

Theoretical aspects of the triplet state particularly as related to reaction mechanisms is discussed at length in "Molecular Photochemistry", N. J. Turro, W. A. Benjamin Inc., New York 1967, Chapter 5 of which discusses inter-molecular energy transfer.

The range of use of the present filters include such applications as:

| Steady-state Illumination | Flash Illumination |
|---|---|
| Sunglasses, welding goggles | Protection against flash blindness and chorioretinal burns by light from nuclear bursts: |
| Skylights | |
| Automobile windows and windshields | Safety goggles for same |
| Windows for buildings and dwellings | Windows and windshields for airplanes for same |
| Windows for space vehicles and aircraft | Safety sight glasses for observational type optical devices (telescopes, binoculars, range finders) |
| Recording tapes with fast readout | Recording tapes with fast read-out |
| Paints and surface coatings for novelty effects | |
| Energy measuring devices | Energy measuring devices |
| Safety glasses for scientific and industrial use in working around intense light sources | Safety glasses for scientific use in working around intense light sources of short duration |
| Display windows for stores | |

It has now been found that the molecules of polynuclear conjugated aromatic ring systems meeting requirements for useful absorption in the metastable states are stabilized at room temperatures — about 20°C. — and over a range of at least −186°C. to temperatures at least about +80°C., by incorporating them into a solid transparent matrix of a polycarbonate or epoxy resin which is free from reactive sites which would react with molecules in the very active triplet state, and deactivate them; and excluding free molecular oxygen.

For fast-acting photochromic effects by triplet-triplet cT'−T) absorption, in the present filter, the energy absorbing electron system in the triplet configuration results from absorption of energy by a singlet configuration at a shorter activating wavelength, then intersystem crossing to a triplet configuration, followed by energy absorption at longer wavelength. Often, the intersystem crossing efficiency of the molecular structure in which the triplet configuration is desired is low, so that a more effective intersystem crossing from singlet to triplet electronic configuration is achieved by using one molecular structure or chromophore system for achieving the intersystem crossing from singlet to triplet followed by transferring the triplet energy to a molecular structure or chromophore which has a comparatively long triplet lifetime and effective absorption at the desired wavelength. If the energy is absorbed as singlet energy in molecular structure "D", and converted in D by intersystem crossing to the triplet state, and then transferred to structure "A", wherein the filtered light is absorbed, the process is called single energy transfer. If absorbed by "A" transferred to "D" as singlet energy, crossed in "D" to triplet energy, and then transferred back to "A", the process is called double energy transfer.

Because of the complexity of the chemistry and quantum mechanics involved, a full list of the known compounds which give useful triplet absorption in the visible reagion, when activated would unduly expand this specification. Reference is made to Stamm et al., U.S. Pat. No. 3,635,544 for some specific molecules.

The photochromic material is placed in the present optically-transparent matrix which, itself, does not compete with the colorless version of the active material for the exciting light in the near ultraviolet (3000–4000., hence rapid and reversible color development can be made to occur as the population of the metastable state is made to be large or vanishingly small by the presence or absence of optical excitation from radiation in the near ultraviolet.

Optical transparency and lack of color of the polymer are both highly desirable, useful polymeric materials include polycarbonates and epoxies.

The presence of excess or residual monomer in the polymeric matrix is decidedly detrimental to the achievement of photochromism when it is governed by a mechanism involving T'–T absorption.

Triplet molecules are also known as biradicals because they possess two unpaired electrons. As such, they are quite reactive and can interact with each other, with oxygen, or with any paramagnetic ion. A single unpaired electron is responsible for the activity of a free radical, with free radicals responsible for many polymerization mechanisms. A biradical could be properly called a double free radical. Hence, the triplet molecules are extremely reactive, and must be locked in a non-reactive matrix to avoid prompt reaction. Such prompt reaction would prevent the desired photochromism.

Thus, it is necessary to employ a matrix of good optical clarity that is free from: residual monomer, plasticizers; and atoms, molecules, ions or molecular fragments capable of reacting rapidly with triplet molecules or other metastable electronic state molecules, which govern the photochromic effect here disclosed.

The present filter can be prepared in the absence of atmospheric oxygen or other molecular oxygen source, or the oxygen can be removed by vacuum, so as to leave the filter molecular oxygen free, at the time of use.

The photochromic filter can be protected from molecular oxygen by protective layers of glass, or other materials through which gaseous oxygen does not diffuse. By oxygen free is meant that the amount of molecular oxygen present is so small as not to affect unduly the photochromic action of the filter. If the molar concentration of oxygen is small, say less than 5 percent of the molar concentration of the photochromic material, the loss is small enough to be acceptable. Even if the filter layer is not initially free from oxygen, heating in vacuum permits the oxygen to diffuse out, to give an oxygen free filter, at time of use.

If free (molecular) oxygen is present, or if residual monomer is present in reactive quantities, the T'–T absorption and filtering effect is reduced, as the triplet form reacts, instead of absorbing light.

In the past, the traditional matrix for photochromic studies has been a frozen solution at 77°K., the temperature of liquid nitrogen. Solvents such as methylcylopentane, tetrahydrofuran, or mixed solvents have been used. At 77°K. diffusion of molecular oxygen is not a problem.

The present matrix system immobilizes the photochromic molecules in an epoxy or polycarbonate polymer, at room temperatures.

The present matrices enhance the lifetime of the triplet state as compared with polymethylmethacrylate (PMMA)

Relative Lifetime In Various Matrices

| Temperature | Polycarbonate | Epoxy | PMMA |
|---|---|---|---|
| at 77°K | 1 | 1 | 1 |
| at 25°C | 1 | 0.8 | 0.5 |

For the above results, the systems were free from molecular oxygen and unpolymerized monomer fragments, which could react with the triplet state molecules.

The polycarbonates may be exemplified by the product sold by General Electric Company as "Lexan" which is a poly-(4,4'-dioxydiphenyl-2,2-propane carbonate) of the formula:

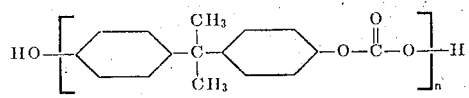

n = about 50 to about 200. The polymer is prepared by condensing bisphenol-A (4,4'-dihydroxy diphenyl-2,2-propane) with phosgene, in the presence of a hydrogen chloride acceptor such as an amine base. The photochromic material can be incorporated as finely divided particles, —as for example obtained by freeze-drying in the finely divided carbonate in an inert atmosphere such as nitrogen, and compression molding, the mixed polycarbonate and photochromic material.

The photochromic material may also be incorporated by dissolving both the photochromic material and the polycarbonate in a solvent such as tetrachloroethane or methylene chloride and vaporizing the solvent.

Polycarbonates have a high transmittance of ultraviolet radiation as well as high transmittance in the visible, and essential freedom from color required in the matrix. The polycarbonate has a high degree of activation at room temperature, so that from about 95 percent to nearly 100 percent of the photochromic material may be activated to the triplet state. Polycarbonates are sufficiently permeable to molecular oxygen that the polycarbonate containing the photochromic material needs to be protected from atmospheric oxygen. The photochromic material in the plastic matrix is conveniently assembled for sealing between layers of glass and then edge sealing. The assembly can be completed, and then sealed in an oxygen free atmosphere, such as nitrogen, or, after assembly, the filter assembly may be evacuated and kept in a vacuum until oxygen has diffused out of the polycarbonate, with nitrogen being used to break the vacuum; and then edge sealing with an oxygen barrier such as polyvinyl alcohol to protect around the edges of the glass filter. The glass may be selected for its radiation transmission characteristics so that in addition to protecting the photochromic material in the polycarbonate matrix, certain radiation is blocked by the glass. A glass that filters out infrared radiation is often preferred.

Epoxy resins are a developing class in which various organic compounds having an epoxy group are reacted with acid anhydrides or polyamines to form a solid which can serve as a matrix with the photochromic material in the present filters. The anhydride hardened resins are more apt to remain free from a yellowish color and hence are preferred. Because with epoxy resins, the hardener is both reactant and catalyst rather than only catalyst, the ratios and thoroughness of mix becomes more critical. The most readily available are epoxies based on the diglycidyl ether of bisphenol-A, from the reaction of bisphenol-A and epichlorhydrin. A typical low color epoxy resin such as Dow Epoxy Resin 332 has a Gardner color of 1, a molecular weight of 340-350, an epoxy equivalent of 173-179, and a viscosity of 3,600 to 6,400 centipoises at 25°C. Conventional hardening techniques are used, and well known in the industry.

The brochure "Anhydride Hardeners for Epoxy Resins", Plastic Division Allied Chemical Co., P.O. Box 365, Morristown, N.J., 07960, (1962) described in considerable detail epoxy resins and anhydride hardeners; and is hereby incorporated by reference herein.

A wide variety of epoxy resins can be used for the matrix, if special physical properties are desired for strength, or other reasons not pertinent to the photochromic aspects, a resin having such properties is chosen.

A catalyst or accelerator is useful to cause the resin to harden more rapidly and at a lower temperature. A self-hardening resin, that is one which hardens at room temperature saves the cost of heating to cure.

Conveniently, the photochromic material is dissolved in the epoxy component so that when reacted with the hardening agent, the photochromic material is in solid solution in the transparent matrix. The epoxy matrix is more resistant to molecular oxygen than the polycarbonate matrix and hence is conveniently formed by reacting under oxygen free conditions with the epoxy resins being placed between protective glass layers before hardening. The epoxy holds the glass layers together and can be edge sealed with polyvinyl alcohol.

An alternative method of edge sealing is to coat the ground edges of the glass layers with a metallizing layer such as platinum, copper or silver, and reducing to the free metal on the ground glass by heating to increase adhesion, then after the glass layer assembly with the photochromic materials in the photochromic matrix, the edge is soldered with a soft solder to give a hermetically sealed structure.

When polyvinyl alcohol is used for edge sealing, it is desirable to freshly grind the glass edge, and then clean the edge with acetone, then coat with polyvinyl alcohol, and let it set.

If the filters are to be used for eye glasses and the like, it is convenient to form the assembly in the same oversize shape as current eye glasses blanks, then cut and grind the glass assembly to the desired size and shape, clean the edges with acetone, and coat with polyvinyl to give the polyvinyl alcohol edge seal.

Representative embodiments of these processes are set forth in the following examples.

EXAMPLE 1

POLYCARBONATE MATRIX

A solution of naphtho[2,3-a]coronene in benzene is freeze dried so as to yield a mixture of amorphous and microcrystalline product. This is mixed intimately with finely-powdered Lexan polycarbonate in an atmosphere of dry nitrogen. The resulting mixture, $5 \times 10^{-3}$ molar in naphtho[2,3-a]coronene, is compression-molded in a dry nitrogen atmosphere to form a clear disk having a diameter of 2 inches and a thickness of 2 mm., which is sealed between two Pyrex glass disks having a 2 inch diameter and thickness, each, of 1.5 mm. to protect the plastic from atmospheric oxygen and water vapor. When examined in ordinary artificial roomlight, the disk shows a yellow color. When exposed to bright, noonday July sun at 41° north latitude on a clear day, the filter assembly shows a pale green color.

EXAMPLE 2

EPOXY MATRIX

A quantity, 0.185 mg., of benzo[a]coronene was added to 9.055 g. of the diglycidyl ether of bisphenol-A (Dow Epoxy Resin 332 R) and heated to 65°C. until the former dissolved in the molten resin. To this was added 0.135 g. of trimethylolpropane which was dissolved by heating to 75°C. after which the solution was cooled to 65°C. and 0.811 g. if diethylenetriamine added with stirring. The clear solution was then poured into a hard glass test tube of 9 mm. bore whose interior previously had been treated with a release agent (ReleasaGen R) and buffed to remove all excess. The tube was kept at 65°C. for about 50 minutes after which the temperature was lowered to 40°C. After 1 additional hour the source of heat was removed and the sample permitted to sit at room temperature (~25°C.) overnight. The sample was then heated at 75°C. for about 8 hours and finally at 100°C. for 30 minutes after which it was permitted to cool and could be removed from the tube. Because of the temperature of the reaction, air was essentially insoluble. From the cylindrical sample thus formed ($6 \times 10^{-5}$ molar) a section 1.5 cm. long by 0.9 cm. in diameter was provided with plane-parallel, polished windows at either end, and the T'–T absorption spectrum photographed using steady-state excitation. When the epoxy sample was compared with its poly(methyl methacrylate) analogue (same concentration, same size and same level of excitation), the epoxy sample gave a stronger photochromic effect which was more pronounced at a lower level of excitation. The results are shown below.

| Matrix | $C_o$(M/L) | (T'–T)$\lambda_{max}$(A) | Optical Exc. 1X | Density/cm Exc. 10X |
|---|---|---|---|---|
| PMMA | $6\times10^{-5}$ | 5670 | 0.449 | 0.822 |
|  |  | 4155 | 0.623 | 1.14 |
| Epoxy | $6\times10^{5}$ | 5875 | 0.467 | 0.855 |
|  |  | 4200 | 0.860 | 1.19 |

PMMA is poly(methyl methacrylate).

i. The wavelengths of the T'–T absorption bands shift to the red in going from poly(methyl methacrylate) to epoxy.
  ii. The headings Exc. 1X and 10X refer to (1 times sunlight) and (10 times sunlight) in terms of quanta/cm².sec incident on sample in the region 3,000 to 4,000A.
  iii. The mean lifetime of the molecules in the lowest (metastable) triplet state in epoxy (4.5 secs) is nearly twice that in poly(methyl methacrylate) (2.3 secs.) at 25°C.
  iv. This increase in lifetime explains the enhanced photochromic performance of the epoxy sample over the poly(methyl methacrylate) sample at 1X sunlight.
  v. At 10X sunlight, because of the low value of $C_o$ in the samples, more than 90 percent of the ground-state molecules are pumped into the triplet state in both samples; hence, their performances are essentially identical.

EXAMPLE 3

One method of limiting the access of oxygen to a photochromic material in a polymer matrix is to assemble the matrix between two sheets of glass, in a nitrogen atmosphere. The sandwich from Example 1 was clamped in a swivel holder employed in binding the edges of lantern slides, and the entire perimeter is bound with several layers of plastic tape. The outer surface of the tape is painted with clear Glyptal varnish which is permitted to harden in the nitrogen atmosphere and then baked with a heat lamp. These precautions were taken to minimize deleterious effects from oxygen. Such edge sealing between glass layers, which may also be filters, or lenses, is one good method of excluding oxygen for a long useful life.

EXAMPLE 4

A second similar sample was protected by grinding the glass protective sheets to the desired size, the final shaping being by 600 grit sandpaper, washing with acetone, then coating the edges of the filter assembly with a 10 percent solution of polyvinyl alcohol (PVA) in water. The assembly was dried overnight at room temperature, then at 55°C. for one-half hour, 75°C. for one-half hour and 100°C. for 1 hour. As so protected, the filter was fully active at the end of 12 weeks. Without the PVA layer, a similar filter showed an inactive ring 2 to 3 mm. wide around the edges in less than three weeks. Molecular oxygen is responsible for the inactivation. Heating in a vacuum to remove oxygen restores activity, which permits edge sealing after vacuum reactivation. This method can be used for photochromic sunglasses, in which blanks are cut to size in retail shops, after a customer selects the size and shape of frames desired.

EXAMPLE 5

The edges of a filter consisting of two layers of glass with naphtho[2,3-a]coronene in a polycarbonate matrix, prepared as in Example 1 is edge sealed as in Example 4. The filter thus formed is stable towards atmospheric oxygen for at least 12 weeks at room temperature, and ambient atmosphere exposure.

EXAMPLE 6

2.8 milligrams of benzo[b]chrysene and 20 g. commercial-grade, optical-quality polycarbonate were dissolved in 500 ml. of reagent-grade benzene by shaking in a closed, all-glass container. The solution was then freeze-dried under vacuum to remove the benzene, leaving a porous, fluffy solid product. Approximately 8 grams of this material was compression molded to form a solid, transparent cylinder 9 mm. in diameter. In accordance with the manufacturers instructions, the mold was pre-heated to 260°C., and the desiccated powder molded under 1,200 pounds per square inch with the mold being cooled to 135°C. before pressing out the specimen. From this, a section 15.5 mm. long was cut and the two end faces ground and polished to form a test specimen 15 mm. long. This was subjected to flash excitation (2,500 Joules electrical input to spiral flash lamp) and the T'-T absorption spectrum was photographed.

As prepared the polycarbonate rod showed an optical spectrum comparable to a similar sample of polymethyl-methacrylate, as shown in example 48 of parent application 769,028, supra. After evacuation for 30 minutes at about 0.01 mm. Hg., the polycarbonate sample showed markedly increased T'-T absorption. This shows that molecular oxygen can be removed by vacuum.

EXAMPLE 7

Epoxy Matrix at Higher Concentrations

The solubility of some of the photochromic materials in the components forming the matrix is a limitation on the concentration in preparing a photochromic filter. The multiple benzene rings in effect make the compounds closer and closer to the ring system believed to exist in certain forms of coal, and comparatively nearly as insoluble. Because of the great effectiveness, a very low concentration of the photochromic material is often adequate, but sometimes a very dense thin filter is desired, which requires a greater concentration, and sometimes one which is either above the solubility limits of the photochromic material or one which requires a long time to dissolve in the matrix components.

By dissolving the photochromic material and also one component of the plastic matrix in a common solvent, and evaporating the solvent, saturated solutions or even super-saturated solutions are readily obtained. Either benzene, or a substituted benzene such as chlorobenzene, or dichlorobenzene or toluene, is a solvent for both the photochromic material, and for a polymer component, such as the diglycidyl ether of bisphenol A.

The desired quantity of the photochromic material is dissolved in sufficient analytical reagent grade of benzene to dissolve the photochromic material completely. For a small filter, from 3 to 10 milliliters of benzene is adequate, and in case of doubt a slight excess should be used to be certain that all of the photochromic material is completely dissolved to avoid leaving residual nuclei which would aid crystallization. After the photochromic material is dissolved in the benzene, which may be warmed to speed solution, there is added 0.5325 grams of the diglycidyl ether of bisphenol A CEPON 332) and the mixture agitated until homogeneous. Using a rotating evaporator, the solution is cooled to about 15°C. and vacuum applied while turning the container. Conveniently the container is a small round bottom flask which has a slight depression blown into the bottom to serve as an accumulating point for the concentrate. While applying heat slowly, to avoid boiling, and hence splattering or bumping, vacuum is applied and the benzene solvent is stripped off. After the solution becomes viscous, full vacuum is applied for about 5 minutes, and then while continuing heating to remove the last traces of the benzene, the flask is heated in hot water to about 100°C. This produces a supersaturated solution of the photochromic material in the epoxy.

A mixture is prepared of 0.408 gram of hexahydrophthalic anhydride, and 0.013 gram of phthalic anhydride, which mixture melts at room temperature, and is added to the epoxy. Then there is added 0.028 grams of trimethylol propane and the mixture stirred until homogeneous, under vacuum to avoid introducing air bubbles.

On a flat microscope slide is placed a 0.020 inch thick polycarbonate gasket and the molten mixture of the polymer containing the photochromic material is transferred to the middle of the slide, avoiding bubbles, with any bubbles being broken by a sharp stainless steel needle. A second slide is placed over the first and lowered so as avoid bubbles between the two. The plates are clamped together with a polycarbonate gasket serving as a spacer, then cured at 120°C. for 24 hours after which a post-cure at 145°C. for 10 minutes is used after which the sample is permitted to cool. The sample thus formed is approximately one inch in diameter and is ready for study of its characteristics or use as a filter.

Using benzo[a]coronene ($C_{28}H_{14}$) at a concentration of $2 \times 10^{-3}$ moles per liter at an excitation of about 1.3 X normal bright noon-time in June sun in Stamford, Conn. the optical density at 590 millimicrons is found to be 0.29 whereas the optical density of the unexcited sample was only 0.05.

For a similar preparation using deuterated benzo[a]coronene, the optical density is found to be 0.83 which gives an improvement factor of 2.9 in the optical density by substituting deuterated benzo[a]coronene for regular benzo[a]corene.

A solid solution of benzo[a]coronene in the epoxy matrix at this concentration is difficult to achieve by ordinary solution techniques.

Similarly, other molecules with photochromic characteristics are readily dissolved to form supersaturated solutions by using benzene, chlorobenzene, dichlorobenzene, toluene or xylene as a common solvent for the photochromic material and for the epoxy component of the epoxy resin.

The unpredictability of crystallization is well known. There are times when an organic chemist will have a difficult time getting crystals to form from a preparation, and at others crystals will form almost spontaneously. It depends in part on the degree of agitation, stirring, scratching, the presence of seed crystals and other variables.

Whereas the supersaturated solution of the photochromic material in the epoxide may remain as such almost indefinitely, it is preferred that the hardener and catalyst be added promptly, to be sure of locking the photochromic material as a solid solution in the epoxy matrix, before it can crystallize.

As so formed, with the reaction of the epoxy being aided by heat, atmospheric oxygen is effectively insoluble and hence the matrix as it polymerizes is oxygen free. After cooling, oxygen will slowly penetrate into the matrix. It may be removed by warming in vacuum, and for test purposes, it is convenient to accomplish the polymerization warm, and to store the filter matrix containing the photochromic material in solid solution in the epoxy resin in vacuum.

Depending upon the use which is to be made of the product, the edges of the filter assembly can be ground to size and coated with 10 percent aqueous solution of polyvinyl alcohol, which is dried and cured as described above which markedly reduces or prevents the penetration of oxygen into the epoxy matrix containing the photochromic material.

As is obvious to those skilled in the art, the time and circumstances of the proposed use govern the precautions required to exclude oxygen. For immediate laboratory experiments, the heating to polymerize drives off enough oxygen so that the sample may be used for measurement. Where the assembly is to be used as a filter, in for example eyeglasses, over a considerable period of time, edge sealing with polyvinyl alcohol to exclude atmospheric oxygen; or solder sealing by using metallized glass edges on both cover sheets of the filter, and soldering together with a low temperature solder, results in a more storage-stable filter.

With a polyvinyl alcohol seal, the filter is good for at least 2 years. With a metallic seal, the filter appears to have a life of at least years and probably archival permanence.

An epoxy matrix for the photochromic material is uniquely useful in ophthalmic filters, for sunglasses, and the like.

Epoxy is reactable, with no solvent, so that it may readily be sealed between layers of glass.

Epoxy adheres strongly to glass, so that no other bond or retaining means or steps are required to hold a filter layer between glass cover layers.

Epoxies show a high transmittance for ultraviolet radiation of an activating wavelength (3000 to 4000A) and for the visible region (4000 to 7000A).

Epoxies are mechanically rigid to minimize triplet-triplet annihilation at ambient temperatures, of at least −10°C. to +70°C.

Epoxy has an index of refraction close to that of ophthalmic glasses so that minimal additional refraction occurs as light passes the glass-epoxy interface.

Two previously ground and polished layers of glass, which may be lenses, can be fastened together to give an ophthalmic grade final filter assembly. Conveniently, the layer which is to be closest to the eye, or proximal layer is concave towards the eye, the distal or outer layer is convex, and the two bonded faces of the glass layers are held firmly in place, and need only be fine ground, and need not be polished to form an ophthalmic-grade lens blank.

The exposed surfaces of the lens blank may be shaped to a correction prescription after the glass layers are bonded, or before they are bonded. Bifocal or trifocal corrections are as readily ground into the three layer filter as into a solid glass blank, and can be as optically perfect.

The epoxy matrix with two exposed glass layers inherently forms a safety glass, which minimizes the risk of eye injury by impact.

Conveniently the distal glass layer is concave towards the eye, and can serve as a dish into which the epoxy-photochromic material mixture is placed while soft. The proximal glass layer is brought down convex surface first, and any bubbles inherently tend to be displaced towards the perimeter. The two layers of glass are brought to a desired spacing, using gaskets or guides, and then the epoxy is hardened, and the complete filter is cut to size, edge sealed, and placed in frames, for use as sunglasses, or other protective use.

Epoxies reacted with an acid anhydride hardener tend to be clearer than those using amine hardeners, which at times have an undesirable yellow cast. Also the anhydride cured resins tend to be harder, and hence provide a firmer matrix for the solid solution. A small proportion of trimethylol propane serves as a catalyst, and also as a plasticizer, so that thermal and mechanical shock is less apt to crack the epoxy layer.

The glass layer closest to the eye may be made of a glass having infrared and/or ultraviolet filtering characteristics. The distal glass layer must pass the activating ultraviolet light, but can be of a glass which filters out infrared radiation.

In edge sealing, for maximum adherence of polyvinyl alcohol to the edge of a filter assembly, the edge of the assembly is freshly ground preferably with about a 600 mesh grit with the grinding including both glass layers, and the polymeric matrix. The edge is washed with a volatile hydrophyllic organic solvent, such as acetone, ethanol, methanol or dioxane, or mixtures thereof, and air dried.

A solvent free from hydrophobic residues is needed. Reagent grade acetone gives excellent results, and is easily obtainable. The edges are then coated with a 10 percent polyvinyl alcohol in water mixture, permitted to air dry, or dried in an oven, and the assembly is ready for use. Whereas the polyvinyl alcohol layer alone is resistant to oxygen infusion, as shown by Oster, Nature 196, 1089 to 1090 (Dec. 15, 1962), the grinding and solvent washing is required for adequate adherence to the edges of the filter assembly.

Polycarbonate matrix filters need protection against oxygen more than the epoxy matrix filter.

EXAMPLE 8

Sunglasses with Multiple Components

For use in the bright sun, to protect across the entire visible spectrum, two or more photochromic materials can be used, so that maximum absorbence of each is in a slightly different region, but in total, an absorbency pleasing to the eye is obtained. A set of such glasses is prepared by charging to a 2,000 ml. round bottom flask having a small depression in the bottom to serve as an accumulating sump, 0.0473 gram of perdeuterated benzo[a] coronene, 0.0358 gram of perdeuterated dibenzo[a,g] coronene and 0.0324 gram of tribenzo[b,n, pqr] perylene; then adding 200 grams of chlorobenzene, by pouring down the side of the flask so as to wash all the crystals to the bottom. U. S. Pat. No. 3,475,507, Sedlak, Oct. 28, 1969, METHOD OF PRODUCING LABELED POLYNUCLEAR COMPOUNDS, discloses one method of perdeuterating.

The mixture is heated to boiling and rotated until a clear solution is formed. Then 35.52 grams of the diglycidyl ether of bisphenol A is added, and the mixture again heated, with rotation, until dissolved. The mixture is cooled to about room temperature, and slowly evacuated to avoid bumping. The flask is fitted to permit rotation, as a shell evaporator, and all of the chlorobenzene is evaporated, using heat to about 70°C. while still under vacuum to assure complete removal.

To the solvent-free mixture is added 14.98 grams of vinylcyclohexene dioxide, and the flask rotated to assure uniform mixing. A mixture of 38.40 grams of 1,2-cyclohexane-dicarboxylic anhydride, 3.17 grams of phthalic anhydride, and 2.88 grams of 1,1,1-trimethylol propane is added, and the flask again rotated until the mixture is homogeneous.

The thus formed mixture may be used directly or filtered through a fritted glass disc.

A group of well cleaned 63 mm and 71 mm glass lenses of ophthalmic curvature, are placed with the distal lens facing down, with spacers around the edge, 0.0195 inch thick. 1.52 gram of the mixture is charged to the 63 mm lenses, and 2.12 grams charged to the 71 mm lenses, then the proximal glass layer of the same size is carefully lowered onto the spacers, being careful to eliminate air bubbles. The lenses are held together, while heating to 120°C. for 16.5 hours; 135°C. for 4 hours; 145°C. for 20 hours; then 165°C. for one-half hour; and allowed to cool to room temperature over 3 hours.

An assortment of correction curves is chosen with correction curves of strength and axis to fit a patients prescription, the filter assembly cut to size and shape to fit selected frames, the edges ground with 600 mesh sandpaper, washed with acetone, coated with a 10 percent polyvinyl alcohol-water mixture, dried, cured at 55°C. for one-half hour, 75°C. for one-half hour, and at 100°C. for 1 hour.

The lens is cooled, and mounted in frames.

The lens has shatter-resistant characteristics, so is a safety glass, has ophthalmic quality, and prescription corrections as chosen.

If clear glass lenses are chosen, the transmission in the visible spectrum at low light levels is over 90 percent. In bright June sun, noon, at Stamford, Conn. the luminous transmission drops to about 40 percent.

A proximal lens with greenish or greyish color and a transmission of about 50 percent may be used if a lower transmission is desired. A thicker layer of the photochromic material, with appropriate concentration changes can be used if a greater photochromic darkening is desired.

For sunglasses, the total concentration of photochromic materials is preferably about $5 \times 10^{-5}$ to $1 \times 10^2$ moles per liter of the polymeric matrix. At higher concentrations triplet-triplet annihilation reduces effectiveness, and at lower concentrations the matrix layer must be undesirable thick. Unless isomorphous, the presence of each photochromic material tends to increase the solubilities of the others.

The examples are illustrative only, and any photochromic materials of the triplet-triplet type and their mixtures may be prepared in the present matrix.

I claim:

1. A method of preparing a photochromic filter effective at room temperature consisting essentially of
    a. a photochromic material, the molecules of which have a polynuclear conjugated aromatic ring system, which system has a set of electronic energy levels such that at least one of said levels is metastable and characterized by having strongly-allowed transitions from the metastable level to higher electronic states whose energy spacings relative to the metastable state correspond to energies of photons capable of exciting a visual response in the retina of the human eye, namely whose wavelength is in the range of 4000 to 7500 Angstrom units, and which metastable energy level is populated by producing a redistribution of the electrons such that the electronic configuration peculiar to the ground state is altered to the electronic configuration characteristic of the metastable state when the ground state molecules are subjected to excitation by photons having energies greater than that corresponding to photons having a wavelength of about 6000 Angstroms, b. dispersed as a supersaturated solid solution at a concentration of about $5 \times 10^{-5}$ to $1 \times 10^{-2}$ moles per liter in a substantially optically transparent epoxy resin which shows a high transmittance in the ultraviolet region of 3000 to 4000 A., and is solid at room temperature and substantially free from uncombined oxygen and active centers capable of reacting with free radicals and biradicals, comprising:

completely dissolving at least one such photochromic material in a volatile benzenoid solvent in such volume that said photochromic material is completely soluble therein, and also dissolving therein an epoxide component of a substantially transparent epoxy resin which shows a high transmittance in the ultraviolet region of 3000 to 4000 A., the volume of said solvent being such that said epoxide is also completely soluble therein evaporating said solvent by heat and reduced pressure, under conditions which avoid bumping and boiling, until the said solvent is removed thereby forming a supersaturated solution of said photochromic material in said epoxide, and before the photochromic material crystallizes from the epoxide, adding a hardener, mixing until homogeneous, placing between optically transparent layers through which gaseous oxygen does not diffuse, and holding under a curing cycle until the epoxide and hardener react, thereby forming a stable hard epoxy resin matrix layer in which the molecules of the photochromic material are locked in solid solution, and which is protected from atmospheric oxygen by said optically transparent layer through which gaseous oxygen does not diffuse on each side.

2. The process of claim 1 in which the solvent is selected from the group consisting of benzene, chlorobenzene, a dichlorobenzene, a trichlorobenzene, toluene, a chlorotoluene, and xylene.

3. The process of claim 1 in which the solvent is evaporated as a film on a moving surface.

4. The method of claim 1 in which the epoxy resin comprises the cross-linked reaction product of the diglycidyl ether of bisphenol-A and a phthalic anhydride.

5. The method of claim 4 in which the photochromic material comprises at least one polynuclear conjugated aromatic hydrocarbon ring system compound from the group consisting of naphtho[2,2-a]coronene, benzo[a]coronene, benzo[b]chrysene, deuterated benzo[a]coronene, deuterated dibenzo[a,g]coronene and tribenzo[b,n,pqr]perylene.

6. The method of claim 4 in which the photochromic material is a mixture of deuterated benzo[a]coronene, deuterated dibenzo[$a,g$]coronene and tribenzo[$b,n,pqr$]perylene.

7. The method of Claim 1 in which the epoxy resin is the cross-linked reaction product of (a) a mixture of vinylcyclohexane dioxide and the diglycidyl ether of bisphenol-A and (b) a mixture of hexahydrophthalic anhydride and phthalic anhydride, and (c) a catalytic quantity of 1,1,1-trimethylol propane.

8. The method of claim 7 in which the photochromic material comprises at least one polynuclear conjugated aromatic hydrocarbon ring system compound from the group consisting of naphthol[2,2-a]coronene, benzo[a]coronene, benzo[b]chrysene, deuterated benzo[a]coronene, deuterated dibenzo[a,g]coronene and tribenzo[b,n,pqr]perylene.

9. The method of claim 7 in which the photochromic material is a mixture of deuterated benzo[a]coronene, deuterated dibenzo[a,g]coronene and tribenzo[b,n,pqr]* * * * *